United States Patent [19]

Teng

[11] Patent Number: 5,334,010
[45] Date of Patent: Aug. 2, 1994

[54] VALVE GATED INJECTION MOLDING APPARATUS WITH A SPRING IN THE PISTON

[75] Inventor: Alex C. Teng, Downsview, Canada

[73] Assignee: Mold-Masters Limited, Georgetown, Canada

[21] Appl. No.: 183,313

[22] Filed: Jan. 19, 1994

[30] Foreign Application Priority Data

Dec. 13, 1993 [CA] Canada .................................. 2111248

[51] Int. Cl.[5] ............................................. B29C 45/23
[52] U.S. Cl. .................. 425/563; 264/328.9; 425/564; 425/566
[58] Field of Search ............... 425/562, 563, 564, 565, 425/566; 264/328.9

[56] References Cited

U.S. PATENT DOCUMENTS 4,698,013 10/1987 Butcher ............................... 425/549

Primary Examiner—Tim Heitbrink
Attorney, Agent, or Firm—Dalesman & Company

[57] ABSTRACT

Valve gated injection molding apparatus with a spring mounted on a central pin adjacent the head of a valve member in a spring chamber in each of the pistons. The spring is compressed between the base of the pin and the cap of the piston to preload it. When the valve member and piston are driven forwardly to the closed position, the head of the valve member retracts somewhat into the spring chamber against the force applied forwardly against the head of the valve member by the spring. This cushions the impact of the front end of the valve member in the gate and provides for tight seating of the front end of the valve member in the gate without requiring all of the components to be made to precise tolerances with exact allowance for thermal expansion. The spring is a number of selected disc springs stacked in sets facing in opposite directions, from which the force applied to the head of the valve member is predetermined.

6 Claims, 2 Drawing Sheets

VALVE GATED INJECTION MOLDING APPARATUS WITH A SPRING IN THE PISTON

BACKGROUND OF THE INVENTION

This invention relates generally to injection molding and more particularly to valve gated apparatus wherein the valve member pistons have a spring in a spring chamber.

Valve gated injection molding systems or apparatus with pneumatic or hydraulic actuated pistons to reciprocate the valve member are well known. An example wherein the cap of the piston is retained in place by a resilient retaining ring is shown in U.S. Pat. No. 4,698,013 to Butcher which issued Oct. 6, 1987. However, the prior apparatus has the disadvantage that the components must be made to very precise tolerances with exact allowance for thermal expansion in order to have the front end of the valve member seated exactly in the gate in the forward closed position. If the front end of the valve member does not extend far enough forwardly to seat tightly in the gate in the closed position, an undesirable poor gate vestage will result. On the other hand, if the front end of the valve member extends too far forwardly, the repeated impact in the gate on closing will cause undue wearing of the front end of the valve member and the gate and can result in a fracture of the mold around the gate in some instances.

SUMMARY OF THE INVENTION

Accordingly, it is an object of the present invention to at least partially overcome the disadvantages of the prior art by providing valve gated apparatus wherein the engagement of the valve member by the piston is spring loaded whereby the front end of the valve member seats in the gate in the closed position without necessitating that the components be made to such precise tolerances.

To this end, in one of its aspects, the invention provides valve gated injection molding apparatus having a melt passage extending to a gate leading to a cavity, a valve member with an elongated shaft, a front end, and a rear end extending through the melt passage in alignment with the gate, the valve member having an enlarged head at the rear end, the enlarged head of the valve member being engaged by a piston having a cap removably attached to a main body with a bore through which the elongated shaft of the valve member extends forwardly, the piston being driven in a cylinder to reciprocate the valve member between a retracted open position and a forward closed position in which the front end of the valve member is seated in the gate, having the improvement wherein the main body of the piston has a spring chamber extending in alignment with the valve member, the spring chamber having a rear end which is closed by the removable cap and a front end from which the valve member bore extends, the head of the valve member being received in the spring chamber with the elongated shaft of the valve member extending forwardly therefrom through the valve member bore, the head of the valve member being larger than the valve member bore whereby a stop is provided by the front end of the spring chamber, and compressible spring means mounted in the spring chamber rearwardly adjacent the head of the valve member, whereby in the closed position the head of the valve member retracts somewhat into the spring chamber against a predetermined force applied forwardly against the head of the valve member by the spring means.

Further objects and advantages of the invention will appear from the following description taken together with the accompanying drawings.

DETAILED DESCRIPTION OF THE INVENTION

Figure 1:
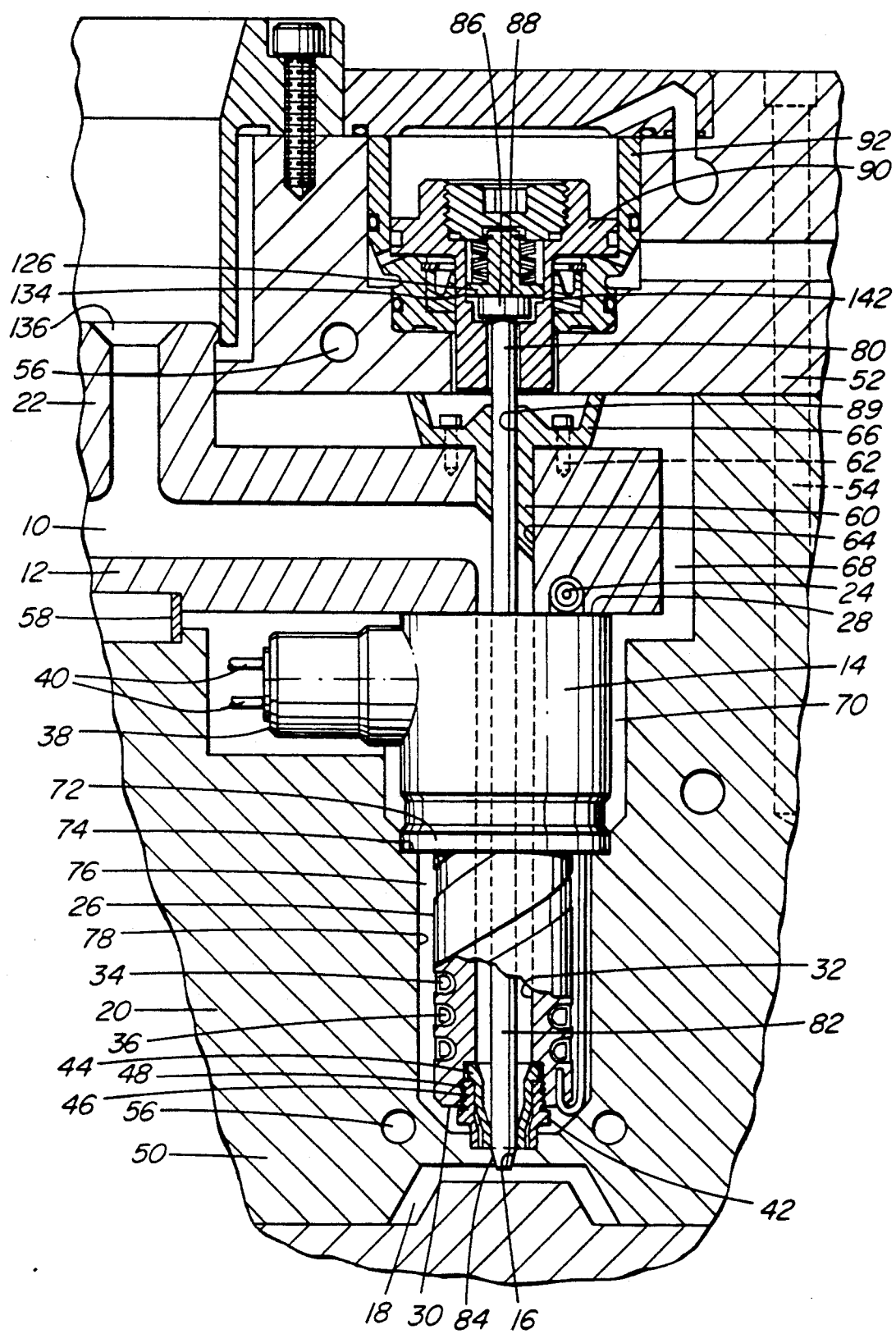
FIG. 1 is a partial sectional view of a portion of a multi-cavity injection molding system or apparatus according to a preferred embodiment of the invention showing the piston and valve member in the closed position.

Reference is first made to FIG. 1 which shows a portion of a multi-cavity valve gated injection molding system having a melt passage 10 which branches in a steel melt distribution manifold 12 to several steel nozzles 14 to convey pressurized plastic melt to respective gates 16 leading to different cavities 18 in the mold 20. The melt distribution manifold 12 has a cylindrical inlet portion 22 and is heated by an integral electrical heating element 24. Each nozzle 14 has an outer surface 26, a rear end 28, a front end 30, and a central melt bore 32 extending from the rear end 28 to the front end 30. The nozzle 14 is heated by an integral electrical heating element 34 which has a spiral portion 36 extending around the melt bore 32 and an external terminal 38 to which electrical leads 40 from a power source are connected. In this particular configuration, a two-piece nozzle seal 42 having a hollow inner piece 44 extending through a threaded outer piece 46 is received in a threaded seat 48 in the front end 30 of the nozzle 14.

While the mold 20 usually has a greater number of plates depending on the application, in this case only a cavity plate 50 and a cylinder plate 52 which are secured together by screws 54 are shown for ease of illustration. The mold 20 is cooled by pumping cooling water through cooling conduits 56 extending in the cavity plate 50 and cylinder plate 52. The distribution manifold 12 is mounted between the cavity plate 50 and the cylinder plate 52 by a central locating ring 58 and sealing bushings 60. Each sealing bushing 60 is secured by screws 62 in a matching opening 64 in the manifold 12 and has a flanged portion 66 which bears against the cylinder plate 52. Thus, an insulative air space 68 is provided between the heated manifold 12 and the surrounding cooled cavity plate 50 and cylinder plate 52. The nozzle 14 is seated in a well 70 in the cavity plate 50 with a cylindrical locating flange 72 extending forwardly to a circular locating shoulder 74 in the well 70. Thus, an insulative air space 76 is similarly provided between the inner surface 78 of the well 70 and the outer surface 26 of the nozzle 14 to provide thermal separation between the heated nozzle 14 and the surrounding cooled mold 20.

Figure 2:
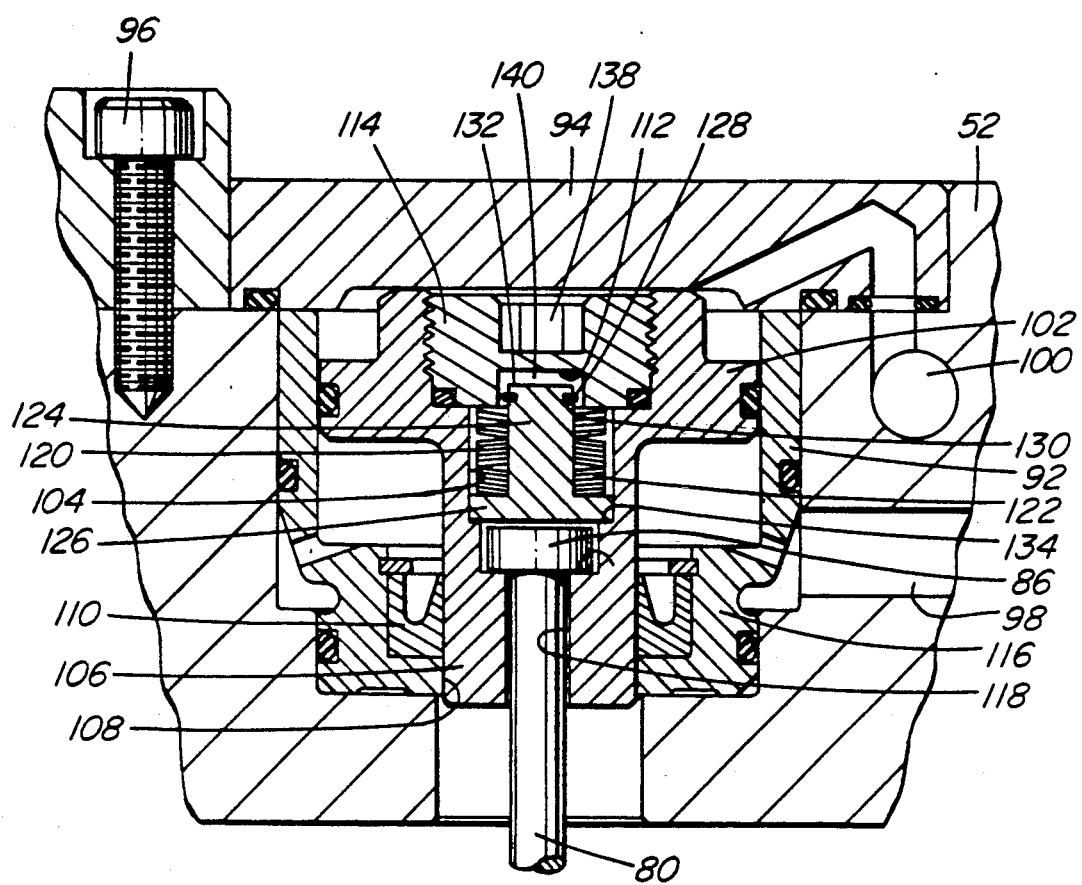
FIG. 2 is an enlarged view of a portion of FIG. 1 showing the piston and valve member in the open position.

A valve member 80 having an elongated shaft 82 with a tapered front end 84 and an enlarged head 86 at the rear end 88 extends through a bore 89 in the sealing bushing 60 into the melt passage 10 and the aligned melt bore 32 through each nozzle 14. The front end 84 extends through the two-piece nozzle seal 42 and is seated in the gate 16 in the closed position as described in more detail below. The rear end 88 of the valve member 80 is engaged by a piston 90 which is reciprocated in a cylinder 92 seated in the cylinder plate 52 to drive the valve member 80. As best seen in FIG. 2, the cylinder 92 is retained in place in the cylinder plate 52 by a circular cover 94 which is secured by screws 96. Hydraulic fluid ducts 98, 100 extend through the cylinder plate 52 to the cylinder 92 on opposite sides of the piston 90. Controlled fluid pressure is applied through these ducts 98, 100 to reciprocate the piston 90 and valve member 80 according to a predetermined cycle in a conventional manner. The piston 90 has a main body 102 with a generally cylindrical spring chamber 104 and an elongated neck portion 106 which extends forwardly through an opening 108 in the cylinder 92. The neck portion 106 of the main body 102 of the piston 90 is surrounded by a V-shaped high pressure seal 110 seated in the cylinder 92 to prevent leakage of pressurized hydraulic fluid around it.

The spring chamber 104 has a rear end 112 closed by a removable threaded cap 114 and a front end 116 from which a central bore 118 extends forwardly through the neck portion 106. The elongated shaft 82 of the valve member 80 extends through the bore 118 from the head 86 which is seated in the spring chamber 104. The circular head 86 of the valve member 80 is larger in diameter than the bore 118 so a stop is provided by the front end 116 of the spring chamber 104. As can be seen, in this embodiment a number of slightly conical disc springs 120 having a central hole therethrough are mounted in a stack 122 on a central pin 124 in the spring chamber 104. In this case, the stack 122 has three sets of five steel BELLEVILLE spring washers with alternate sets facing in opposite directions. During assembly, the stack 122 of disc springs or spring washers 120 is held in place against the base 126 of the central pin 124 by a resilient retaining ring 128 seated in the outer surface 130 of the central pin 124 near its rear end 132. When the cap 114 is screwed into place, it compresses the disc springs 120 to preload them so a force is applied forwardly through the base 126 of the central pin 124 to the head 86 of the valve member 80 when the piston 90 is driven forwardly to the closed position. The size, number and arrangement of the disc springs 120 are selected to predetermine the amount of force applied to the head 86 of the valve member 80. In other embodiments, other arrangements of compression springs can be mounted in the spring chamber 104 to provide the predetermined preload. In this embodiment, in the open position shown in FIG. 2 the base 126 of the central pin 124 abuts against a circular shoulder 134 which extends around and is positioned longitudinally in the spring chamber 104 to ensure the head 86 has clearance to move slightly laterally with the valve member 80 due to thermal expansion of the manifold 12 when it is first heated up.

In use, the system or apparatus is assembled as shown in FIG. 1 and described above. While only a single cavity 18 has been shown for ease of illustration, it will be appreciated that the melt passage 10 normally branches in the melt distribution manifold 12 to pass through numerous nozzles 14 to numerous different cavities 18. Electrical power is applied to the heating element 24 in the manifold 12 and the heating elements 34 in the different nozzles 14 to heat them to a predetermined operating temperature. As mentioned above, provision has been made for slight lateral movement of the valve member 80 in the piston 90 due to thermal expansion of the manifold 12 as it heats up. Hot pressurized melt is then injected from a molding machine (not shown) into the melt passage 10 through the central inlet 136 according to a predetermined cycle in a conventional manner. The melt passage 10 branches outwardly in the manifold 12 to each nozzle 14 where it extends through the central bore 32 and then through the aligned nozzle seal 42 to the respective gate 16. In this embodiment, controlled hydraulic pressure is applied to the cylinders 92 through hydraulic fluid ducts 98, 100 to control actuation of the pistons 90 and valve members 80 according to a predetermined cycle in a conventional manner. In other embodiments, the pistons 90 can be driven pneumatically rather than hydraulically. When the valve members 80 and pistons 90 are in the retracted open position shown in FIG. 2, the piston 90 stops against the cover 94 and the threaded cap 114 which has been tightened into position by a wrench in socket 138 applies a predetermined preload to the stack 122 of disc springs 120 as described above. As can be seen, there is sufficient space 140 between the rear end 132 of the pin 124 and the cap 114 to allow for further compression of the stack 122 of disc springs 120 during closing. The pressurized melt flows through the melt passage 10 and the gates 16 until the cavities 18 are full. When the cavities 18 are full, injection pressure is held momentarily to pack. The hydraulic pressure is then reversed to reciprocate the valve members 80 and pistons 90 to the forward closed position shown in FIG. 1 in which the tapered front end 84 of each of the valve members 80 is seated in one of the gates 16. During closing, the stack 122 of disc springs 120 is further compressible to allow the head 86 of the valve member 80 to retract somewhat into the spring chamber 104 to soften the impact of the front end 84 of the valve member 80 in the gate 16. This reduces wear of the front end 84 of the valve member 80 and also reduces wear and cracking of the cavity plate 50 around the gate 16. In the closed position there is a space 142 between the base 126 of the central pin 124 and the circular shoulder 134 which is equal to the amount the stack 122 of disc springs 120 is further compressed. In some applications this compressibility of the stack 122 of disc springs 120 is particularly advantageous in allowing the front end 84 of the valve member 80 to seat tightly in the gate 16 by more gradually melting through any plastic which has solidified in the gate 16 during the previous ejection. After closing, the injection pressure is then released and, after a short cooling period, the mold is opened for ejection. After ejection, the mold is closed, hydraulic pressure is applied to retract the valve members 80 to the open position and melt injection pressure is reapplied to refill the cavities 18. This cycle is repeated continuously with a frequency depending upon the number and size of the cavities and the type of material being molded.

While the description of the injection molding apparatus wherein the engagement of the valve members 80 by the pistons 90 is spring loaded according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In a valve gated injection molding apparatus having a melt passage extending to a gate leading to a cavity, a valve member having a front end, a rear end and an elongated shaft between said front and rear ends said valve member extending through the melt passage in alignment with the gate, the valve member having an enlarged head at the rear end, the enlarged head of the valve member being engaged by a piston having a cap removably attached to a main body of said piston, said piston having a bore through which the elongated shaft of the valve member extends forwardly, the piston being driven in a cylinder to reciprocate the valve member between a retracted open position and a forward closed position in which the front end of the valve member is seated in the gate, having the improvement wherein;

the main body of the piston has a spring chamber extending in alignment with the valve member, the spring chamber having a rear end which is closed by the removable cap and a front end from which the valve member bore extends, the head of the valve member being received in the spring chamber with the elongated shaft of the valve member extending forwardly therefrom through the valve member bore, the head of the valve member being larger than the valve member bore whereby a stop is provided by the front end of the spring chamber, and compressible spring means mounted in the spring chamber rearwardly adjacent the head of the valve member, whereby in the closed position the head of the valve member retracts somewhat into the spring chamber against a predetermined force applied forwardly against the head of the valve member by the spring means.

2. Injection molding apparatus as claimed in claim 1 wherein the spring means includes a plurality of disc springs mounted in a stack on a central pin in the spring chamber.

3. Injection molding apparatus as claimed in claim 2 wherein the central pin has an enlarged base which abuts against the head of the valve member in the closed position, the stack of disc springs being preloaded by being compressed between the enlarged base of the pin and the cap of the piston, whereby the predetermined force is applied through the base of the pin to the head of the valve member.

4. Injection molding apparatus as claimed in claim 3 wherein the spring chamber extends centrally in the main body of the piston and is generally cylindrical with a circular shoulder against which the base of the central pin is in bearing contact in the open position, the circular shoulder being positioned longitudinally in the spring chamber to ensure that in the open position the head of the valve member has clearance to move laterally in the spring chamber due to thermal expansion of the manifold.

5. Injection molding apparatus as claimed in claim 4 wherein each of the disc springs is slightly conical in shape.

6. Injection molding apparatus as claimed in claim 5 wherein the disc springs are mounted in a plurality of sets, with the disc springs in alternate sets facing in opposite directions.

* * * * *